(12) United States Patent
Resconi et al.

(10) Patent No.: US 9,029,284 B2
(45) Date of Patent: May 12, 2015

(54) CATALYSTS

(75) Inventors: Luigi Resconi, Ferrara (IT); Pascal Castro, Helsinki (FI); Lauri Huhtanen, Lovlisa (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/518,698

(22) PCT Filed: Dec. 21, 2010

(86) PCT No.: PCT/EP2010/070354
§ 371 (c)(1),
(2), (4) Date: Sep. 13, 2012

(87) PCT Pub. No.: WO2011/076780
PCT Pub. Date: Jun. 30, 2011

(65) Prior Publication Data
US 2013/0018156 A1    Jan. 17, 2013

(30) Foreign Application Priority Data

Dec. 22, 2009  (EP) .................................. 09252863

(51) Int. Cl.
*C08F 4/642* (2006.01)
*C08F 4/6592* (2006.01)
(Continued)

(52) U.S. Cl.
CPC ......... *C08F 4/65927* (2013.01); *C08F 4/65912* (2013.01); *C08F 210/06* (2013.01); *C08F 10/00* (2013.01); *C08F 110/06* (2013.10); *Y10S 526/943* (2013.01)

(58) Field of Classification Search
CPC ............. C08F 4/65912; C08F 4/65927; C08F 110/06; C08F 210/06
USPC .......... 502/103, 104, 107, 152; 526/160, 165, 526/943, 348, 351
See application file for complete search history.

(56) References Cited

U.S. PATENT DOCUMENTS 7,341,971 B2 * 3/2008 Denifl et al. ................... 502/102
2009/0198027 A1 * 8/2009 Resconi et al. ................ 526/156

FOREIGN PATENT DOCUMENTS

WO    WO-03/051934 A2    6/2003
WO    WO-2006/069733 A1    7/2006
(Continued)

OTHER PUBLICATIONS

International Preliminary Report on Patentability issued on Jun. 26, 2012 for PCT/EP2010/070354 filed on Dec. 21, 2010 and published as WO 2011/076780 on Jun. 30, 2011 (Applicants—Borealis AG; Inventors—Resconi et al.) (7 pages).

(Continued)

*Primary Examiner* — Caixia Lu
(74) *Attorney, Agent, or Firm* — Ballard Spahr LLP

(57) ABSTRACT

A solid particulate catalyst free from an external carrier comprising:
(i) a complex of formula (I):

$$\text{(I)}$$

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;
each $R_1$ independently is hydrogen or a linear or branched C1-C20 hydrocarbyl radical optionally containing one or more heteroatoms from groups 14-16 of the Periodic Table of the Elements;
each $R_2$ and $R_3$ taken together form a 4-7 membered ring condensed to the benzene ring of the indenyl moiety, said ring optionally containing heteroatoms from groups 14-16, each atom forming said ring being optionally substituted with at least one $R_{18}$ radical;
each $R_{18}$ is the same or different and may be a C1-C20 hydrocarbyl radical optionally containing one or more heteroatoms belonging to groups 14-16;
each $R_4$ is a hydrogen atom or a $C_{1-6}$-hydrocarbyl radical optionally containing one or more heteroatoms belonging to groups 14-16;
each W is independently a 5 or 6 membered aryl or heteroaryl ring wherein each atom of said ring is optionally substituted with an $R_5$ group;
each $R_5$ is the same of different and is a C1-C20 hydrocarbyl radical optionally containing one or more heteroatoms belonging to groups 14-16; and optionally two adjacent $R_5$ groups taken together can form a further mono or multicyclic ring condensed to W optionally substituted by one or two groups $R_5$; and
(ii) a cocatalyst comprising an organometallic compound of a Group 13 metal, preferably aluminoxane.

14 Claims, 1 Drawing Sheet

(51) Int. Cl.
*C08F 110/06* (2006.01)
*C08F 210/06* (2006.01)
*C08F 4/659* (2006.01)
*C08F 10/00* (2006.01)

(56) References Cited

FOREIGN PATENT DOCUMENTS

| WO | WO-2006/097497 A1 | 9/2006 |
| WO | WO-2006/097500 A1 | 9/2006 |
| WO | WO-2006/134046 A1 | 12/2006 |
| WO | WO-2007/122097 A1 | 11/2007 |
| WO | WO-2007/122098 A1 | 11/2007 |
| WO | WO-2009/080710 A1 | 7/2009 |

OTHER PUBLICATIONS

International Search Report mailed on Apr. 18, 2011 for PCT/EP2010/070354 filed on Dec. 21, 2010 and published as WO 2011/076780 on Jun. 30, 2011 (Applicants—Borealis AG; Inventors—Resconi et al.) (4 pages).

Written Opinion mailed on Apr. 18, 2011 for PCT/EP2010/070354 filed on Dec. 21, 2010 and published as WO 2011/076780 on Jun. 30, 2011 (Applicants—Borealis AG; Inventors—Resconi et al.) (6 pages).

Busico V, et al. (2010) Microstructure of polypropylene. Progress in Polymer Science, 26: 443-533.

De Rosa C, et al. (2005) Crystallization Behavior and Mechanical Properties of Regiodefective, Highly Stereoregular Isotactic Polypropylene: Effect of Regiodefects versus Stereodefects and Influence of the Molecular Mass. Macromolecules, 38: 9143-9154.

Endres A, et al. (2000) Die fluorige Phase: Organische Chemie mit hochfluorier Reagenzien und Lösungsmitteln. Chemie in unserer Zeit. Jarg., 6: 34.

Lo Nostro. (1995) Phase separation properties of fluorocarbons, hydrocarbons and their copolymers. Advances in Colloid and Interface Science, 56: 245-287.

\* cited by examiner

Inventive Example 1 (squares) vs. Comparative example B (triangles): Catalyst activity vs IV
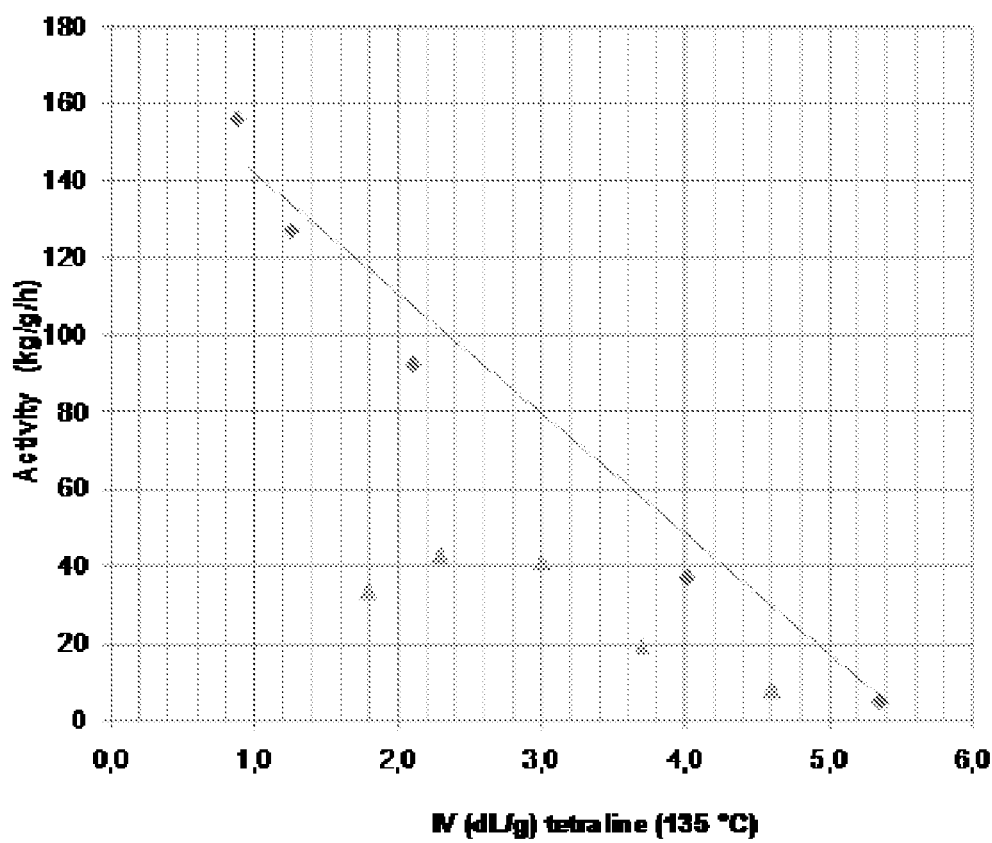

CATALYSTS

CROSS-REFERENCE TO RELATED APPLICATIONS

The present application is a U.S. National Phase Application of International Application No. PCT/EP2010/070354, filed Dec. 21, 2010, which claims priority to European Patent Application No. 09252863.7, filed Dec. 22, 2009, all of which applications are incorporated herein fully by this reference.

This invention relates to catalysts comprising bridged bis indenyl II-ligands useful in the formation of olefin polymerisation catalysts, as well as the use thereof in olefin polymerisation. In particular, the invention relates to catalysts which comprise certain bridged bis indenyl complexes in solid form but without the use of an external support.

Metallocene catalysts have been used to manufacture polyolefins for many years. Countless academic and patent publications describe the use of these catalysts in olefin polymerisation. Metallocenes are now used industrially and polyethylenes and polypropylenes in particular are often produced using cyclopentadienyl based catalyst systems with different substitution patterns.

These metallocenes can be used in solution polymerisation but results of such polymerisations have generally been poor. These metallocenes are therefore conventional supported on a carrier such as silica. Research has found that heterogeneous catalysis (in which the catalyst particles do not dissolve in the reaction medium) gives rise to better polymer products than homogeneous catalysis (in solution). The use therefore of a support is common place. The use however of supported catalysts is associated with problems such as silica residues in the final product. Further, there is still room for improved activity, and improved polymer particle formation.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organotransition metal catalyst without using e.g. external porous carrier particles, such as silica, normally required in the art. Thus, problems relating to catalyst silica residues can be solved by this type of catalyst. Further, it could be seen that catalyst particles having improved morphology, will give, due to the replica effect, polymer particles having improved morphology as well.

Although a lot of work has been done in the field of metallocene catalysts, both with conventional supported catalysts as well with solid catalysts prepared according to the principles as described in said WO03/051934, there remain still some problems, which relate especially to the productivity or activity of the catalysts. Especially the productivity or activity has been found to be relatively low, when polymers of high intrinsic viscosity (IV) (i.e. high molecular weight, Mw) are produced using known catalysts.

There remains a need therefore to find new catalysts for olefin polymerisation, which are able to produce polymers with desired properties and which have high activity and/or productivity. Further, it is highly desired in many polymer applications that no silica residues remain in the final product.

A further problem relating to the catalyst activity seems to be that activity of known catalysts is not at a sufficiently high level over a broad range of hydrogen concentration, i.e. where the skilled man is producing lower or higher Mw polymers. Thus, catalysts having broader operating windows, i.e. good activity over a broad range of molecular weights of the polymer, are highly desired. Further, the problems with conventional silica supported catalysts have to be avoided.

In particular, the present inventors were faced with the problem of manufacturing a polymer with high molecular weight (i.e. enabling the formation of polymer components with high IV).

The present inventors have now found a new class of olefin polymerisation catalysts, which are able to solve the problems disclosed above, and which catalysts are not previously described in the art. The invention combines the catalyst emulsion/solidification techniques of WO03/051934 with a specific group of metallocene complexes, known only in connection with conventional external supports. This combination surprisingly results in catalysts having high activity, i.e. improved activity over the known supported catalysts as well over known catalysts prepared according to WO03/051934. Moreover, this combination enables the formation of polymers having a broad range of molecular weights, especially, very high molecular weight products, and avoids known problems of the conventional supported catalysts, as described above.

The complexes used in the manufacture of the catalysts of the invention are as such not new. They are disclosed in WO2006/097497 but only in conjunction with an inert support. It has now surprisingly found that using these particular complexes in solid form but not being supported on an external support, e.g. silica, the resulting catalyst comprehensively out performs the silica supported catalyst and also catalysts prepared according to the method of WO03/051934, but using different complexes. This is an entirely surprising result.

In particular catalyst activity is very high over a wide range of hydrogen concentration within the polymerisation reactor. Also, productivity (in terms of polymer produced) is very high, especially as hydrogen concentration within the polymerisation rector is increased, but also, which is still more remarkable, when low amount of hydrogen is used, i.e. when polymers with high molecular weight are produced. Thus, the catalyst of the invention is very suitable for a wide range of end applications, i.e. applications having different molecular weight requirements.

Thus, viewed from one aspect the invention provides a solid particulate catalyst free from an external carrier comprising:

(i) a complex of formula (I):

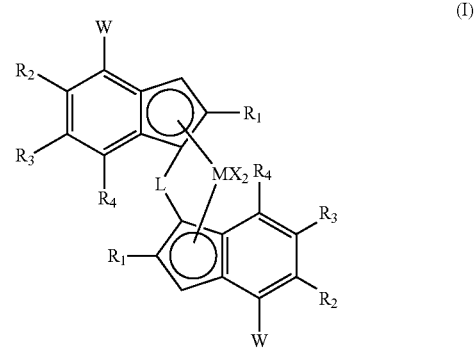

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;

each $R_1$ independently is hydrogen or a linear or branched C1-C20 hydrocarbyl radical optionally containing one or more heteroatoms from groups 14-16 of the Periodic Table of the Elements;

each $R_2$ and $R_3$ taken together form a 4-7 membered ring condensed to the benzene ring of the indenyl moiety, said ring optionally containing heteroatoms from groups 14-16, each atom forming said ring being optionally substituted with at least one $R_{18}$ radical;

each $R_{18}$ is the same or different and may be a C1-C20 hydrocarbyl radical optionally containing one or more heteroatoms belonging to groups 14-16;

each $R_4$ is a hydrogen atom or a $C_{1-6}$-hydrocarbyl radical optionally containing one or more heteroatoms belonging to groups 14-16;

each W is independently a 5 or 6 membered aryl or heteroaryl ring wherein each atom of said ring is optionally substituted with an $R_5$ group;

each $R_5$ is the same or different and is a C1-C20 hydrocarbyl radical optionally containing one or more heteroatoms belonging to groups 14-16; and optionally two adjacent $R_5$ groups taken together can form a further mono or multicyclic ring condensed to W optionally substituted by one or two groups $R_5$;

and (ii) a cocatalyst comprising an organometallic compound of a Group 13 metal;

in particular a catalyst obtainable by a process in which (I) a liquid/liquid emulsion system is formed, said liquid/liquid emulsion system comprising a solution of the catalyst components (i) and (ii) dispersed in a solvent so as to form dispersed droplets; and (II) solid particles are formed by solidifying said dispersed droplets.

Viewed from another aspect the invention provides a process for the manufacture of a catalyst as hereinbefore defined comprising obtaining a complex of formula (I) and a cocatalyst as hereinbefore described;

forming a liquid/liquid emulsion system, which comprises a solution of catalyst components (i) and (ii) dispersed in a solvent, and solidifying said dispersed droplets to form solid particles.

Viewed from another aspect the invention provides the use in olefin polymerisation of a catalyst as hereinbefore defined.

Viewed from another aspect the invention provides a process for the polymerisation of at least one olefin comprising reacting said at least one olefin with a catalyst as hereinbefore described.

DEFINITIONS

Throughout the description the following definitions are employed.

By free from an external carrier is meant that the catalyst does not contain an external support, such as an inorganic support, for example, silica or alumina, or an organic polymeric support material.

The term $C_{1-20}$ hydrocarbyl group covers any $C_{1-20}$ group comprising carbon and hydrogen only. Any $C_{1-20}$ hydrocarbyl group is preferably a $C_{1-15}$ hydrocarbyl group, more preferably a $C_{1-10}$ hydrocarbyl group, especially a $C_{1-6}$ hydrocarbyl group.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups.

Unless otherwise stated, preferred $C_{1-20}$ hydrocarbyl groups are $C_{1-20}$ alkyl groups or $C_{6-20}$ aryl groups, especially $C_{1-10}$ alkyl groups or $C_{6-10}$ aryl groups, e.g. $C_{1-6}$ alkyl groups. Most especially preferred hydrocarbyl groups are methyl, ethyl, propyl, isopropyl, tertbutyl, phenyl or benzyl.

The term halo includes fluoro, chloro, bromo and iodo groups, especially chloro groups, when relating to the complex definition.

The term heteroaryl means a monocyclic aromatic ring structure comprising at least one heteroatom. Preferred heteroaryl groups have 1 to 4 heteroatoms selected from O, S and N, especially O and N. Preferred heteroaryl groups include furanyl, thiphenyl, oxazole, thiazole, isothiazole, isooxazole, triazole and pyridyl.

Any group including "one or more heteroatoms belonging to groups 14-16" preferably means O, S or N. N groups may present as —NH— or —NR"— where R" is C1-10 alkyl.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands ligands can vary greatly.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit catalyst. Intrinsic viscosity (IV) of the polymers is a measure relating to molecular weight. The higher the IV the higher is the Mw of the polymer.

DETAILED DESCRIPTION OF INVENTION

It is preferred if the two multicyclic ligands making up the complex of formula (I) are identical. It is also preferred if a substituent on one ring is the same as the corresponding substituent on the other. Thus, both $R_1$'s are preferably the same. Both $R_4$'s are preferably the same and so on. Preferably, the metallocene compounds of the present invention are in their racemic (rac) form.

M is preferably Zr or Hf, especially Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical; optionally containing heteroatoms belonging to groups 14-16. R is preferably a $C_{1-6}$ alkyl, phenyl or benzyl group.

Most preferably each X is independently a hydrogen atom, a halogen atom, $C_{1-6}$-alkoxy group or an R group, e.g. preferably a $C_{1-6}$-alkyl, phenyl or benzyl group. Most preferably X is chlorine or a methyl radical. Preferably both X groups are the same.

L is preferably a bridge comprising a heteroatom, such as silicon or, germanium, e.g. —$SiR^6_2$—, wherein each $R^6$ is independently C1-C20-alkyl, C6-C20-aryl or tri(C1-C20- alkyl)silyl-residue, such as trimethylsilyl. More preferably $R^6$ is $C_{1-6}$-alkyl, especially methyl. Most preferably, L is a a dimethylsilyl or ethylene bridge.

$R_1$ is preferably a linear or branched C1-C20-alkyl, C2-C20 alkenyl, C2-C20 alkynyl radical or an alpha branched aryl or arylalkyl radical containing from 4 to 20 carbon atoms optionally containing O, N, S, P or Se atoms, in particular O, N and S atoms such as 2-(5-Me-thiophenyl) or 2-(5-Me-furanyl) radicals. More preferably $R_1$ is a linear or branched $C_{1-10}$-alkyl radical, like a linear or branched $C_{1-6}$-alkyl radical. $R_1$ is ideally a methyl, or ethyl radical.

Preferably $R_2$ and $R_3$, taken together form a non aromatic 4-7 membered ring. It is also preferred if $R_2$ and $R_3$, taken together, form a 5 or 6 membered ring condensed to the benzene ring of the indenyl ligand. Most especially, the ring is five membered. Preferred rings are free of any double bonds (other than between the atoms of the benzene ring).

If substituted by a group $R_{18}$, it is preferred if there are 1 to 4, preferably 1 or 2 such groups present. The $R_2$ and $R_3$ ring is however, preferably unsubstituted. The $R_2$ and $R_3$ ring is also preferably carbocyclic and free of any heteroatoms.

Preferably $R_{18}$ is linear or branched, cyclic or acyclic, C1-20-alkyl, C2-C20 alkenyl, C2-C20 alkynyl, C6-C20-aryl, C7-C20-alkylaryl or C7-C20-arylalkyl radical, optionally containing one or more heteroatoms belonging to groups 14-16.

More preferably $R_{18}$ a linear or branched, $C_{1-10}$-alkyl radical. More preferably $R_{18}$ is a methyl or ethyl radical. It is within the scope of the invention for two $R_{18}$ groups to bind to the same atom of the ring although this is not preferred. Preferably the ring is unsubstituted.

$R_4$ is preferably a hydrogen atom or $C_{1-6}$ alkyl such as methyl, ethyl, propyl or isopropyl group, most preferably methyl.

W is preferably an optionally substituted phenyl group, or a 5 or 6 membered heteroaryl group such as a furanyl, thiophenyl, pyrrolyl, triazolyl, and pyridinyl.

Any five membered heteroaryl group should preferably comprise one heteroatom in the ring, such as O, N or S.

Preferably W is a phenyl derivative. More preferably the phenyl derivative is unsubstituted or carries one substituent.

The optional substituent on any W group is $R_5$. If present, there should be 1 or 2 $R_5$ groups, preferably one $R_5$ group.

Preferably $R_5$ is a linear or branched, cyclic or acyclic, C1-C20-alkyl, C2-20 alkenyl, C2-C20 alkynyl, C6-C20-aryl, C7-C20-alkylaryl or C7-C20-arylalkyl radical optionally containing one or more heteroatoms belonging to groups 14-16. Preferably $R_5$ is a linear or branched, cyclic or acyclic, C1-C10-alkyl group.

In one preferred embodiment two adjacent $R_5$ groups taken together can form a further mono or multicyclic ring condensed to W. The new ring is preferably 5 or 6 membered or the $R_5$ groups preferably form two new rings such a one further five membered and six membered ring.

The new ring or rings can be aliphatic or aromatic. Preferably any new ring forms an aromatic system with the W ring to which it is attached.

In this way groups such as carbazolyl, benzothiophenyl and naphthyl can be formed at position W. It is also within the scope of the invention for these new rings to be substituted by 1 or 2 $R_5$ groups (in which the option of two adjacent $R_5$ groups forming another ring is excluded).

In a most preferred embodiment, W is a phenyl group carrying one $R_5$ substituent. Preferably that substituent is carried para to the bond to the indenyl ring. That substituent is also preferably a $C_{1-10}$-alkyl radical. Furthermore, the carbon atom of the $R_5$ group bonding to the W ring is preferably a tertiary carbon atom.

Thus viewed from another aspect the invention provides a complex of formula (II):

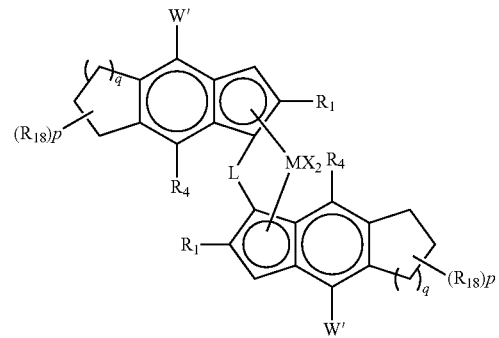

wherein
M is Zr or Hf;
each $R_1$ is a linear or branched C1-10 alkyl;
L is ethylene or $SiR^6_2$;
$R^6$ is C1-10 alkyl, $C_{6-10}$-aryl, $C_{7-12}$-alkylaryl, or $C_{7-12}$-arylalkyl;
each X is a hydrogen atom, $C_{1-6}$alkoxy, a halogen atom, or an R group;
R is $C_{1-10}$ alkyl
each $R_4$ is H or $C_{1-3}$-alkyl;
each q is 1 to 3;
each p is 0 to 5;
W' is phenyl, pyridyl, thiophenyl or furyl optionally substituted by up to 2 groups $R_5$;
each $R_5$ is $C_{1-10}$-alkyl or two adjacent $R_5$ groups taken together form a phenyl ring fused to W' or two adjacent $R_5$ groups taken together form the atoms necessary to form a carbazolyl group with the W' group; and
each $R_{18}$ is $C_{1-6}$-alkyl.

In a preferred embodiment therefore the complex of the invention is of formula (III)

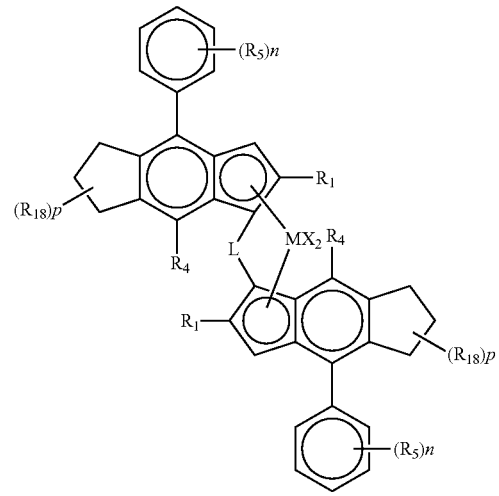

wherein
M is Zr or Hf;
each $R_1$ is a linear or branched C1-10 alkyl;

L is ethylene or $SiR^6{}_2$;

$R^6$ is C1-10 alkyl, $C_{6-10}$-aryl, $C_{7-12}$-alkylaryl, or $C_{7-12}$-arylalkyl;

each X is a hydrogen atom, $C_{1-6}$ alkoxy, a halogen atom, or an R group;

R is $C_{1-10}$ alkyl each $R_4$ is H or $C_{1-3}$-alkyl;

n is 0 to 2;

p is 0 to 2;

each $R_5$ is $C_{1-10}$-alkyl and each $R_{18}$ is $C_{1-6}$-alkyl

In a still further preferred embodiment, the invention provides a complex of formula (IV) as herein before defined in which:

M is Zr;

$R_1$ is methyl or ethyl

L is $SiR^6{}_2$;

$R^6$ is $C_{1-6}$ alkyl;

each X is a a halogen atom, methoxy, or methyl;

$R_4$ is H or methyl n is 1 p is 0 or 1;

$R_5$ is C1-6 alkyl; and $R_{18}$ is C1-6 alkyl;

For the avoidance of doubt, any narrower definition of a substituent offered above can be combined with any other broad or narrowed definition of any other substituent.

Examples of compounds having formula (I) are as follows $Me_2Si(2-Me-4-Ph-1,5,6,7-tetrahydro-s-indacen-1-yl)_2ZrCl_2$, $Me_2Si(2,8-Me_2-4-Ph-1,5,6,7-tetrahydro-s-indacen-1-yl)ZrCl_2$, $Me_2Si[2-Me-4-(4-t-BuPh)-1,5,6,7-tetrahydro-s-indacen-1-yl]_2ZrCl_2$, $Me_2Si(2,8-Me_2-4-(4-t-BuPh)-1,5,6,7-tetrahydro-s-indacen-1-yl)_2ZrCl_2$, $Me_2Si[2-Me-4-(2-MePh)-1,5,6,7-tetrahydro-s-indacen-1-yl]_2ZrCl_2$, $Me_2Si(2,8-Me_2-4-(2-MePh)-1,5,6,7-tetrahydro-s-indacen-1-yl)_2ZrCl_2$, $Me_2Si(2,5,5,7,7,-Me_5-4-(2-MePh)-1,5,6,7-tetrahydro-s-indacen-1-yl)_2ZrCl_2$, $Me_2Si[2-Me-4-(2,5-Me_2Ph)-1,5,6,7-tetrahydro-s-indacen-1-yl]_2ZrCl_2$, $Me_2Si[2-Me-4-(4-biphenyl)-1,5,6,7-tetrahydro s-indacen-1-yl]_2ZrCl_2$, $Me_2Si(2,5,5,7,7-Me_5-4-Ph-1,5,6,7-tetrahydro-s-indacen-1-yl)_2ZrCl_2$, $Me_2Si[2,5,5,7,7-Me_5-4-(4-tBuPh)-1,5,6,7-tetrahydro-s-indacen-1-yl]_2ZrCl_2$, $Me_2Si(2,6,6-Me_3-4-Ph-1,5,6,7-tetrahydro-s-indacen-1-yl)_2ZrCl_2$, $Me_2Si(2-Me-4-Ph-7H-cyclopenta[b]naphthalen-1-yl)_2ZrCl_2$, $Me_2Si(2,5,8-Me_3-4-Ph-7H-cyclopenta[b]naphthalen-1-yl)_2ZrCl_2$, $Me_2Si(2-Me-4-Ph-5,6,7,8-tetrahydro-7H-cyclopenta[b]naphthalen-1-yl)_2ZrCl_2$, $Me_2Si(2,6-Me_2-4-Ph-5H-1-thia-s-indacen-1-yl)_2ZrCl_2$, $Me_2Si(2,5,6-Me_3-4-Ph-5H-1-thia-s-indacen-1-yl)_2ZrCl_2$, $Me_2Si(2,5,6-Me_3-4-(4-t-BuPh)-5H-1-thia-s-indacen-1-yl)_2ZrCl_2$, $Me_2Si(2-Me-4-Ph-1,5,6,7,8,9-hexahydrocyclohepta[f]inden-1-yl)_2ZrCl_2$,]

$Me_2Si(2-Me-4-(2-benzothiophenyl)-1,5,6,7-tetrahydro-s-indacen-1-yl)_2ZrCl_2$, $Me_2Si(2-Me-4-(2-(5-methylthiophenyl))-1,5,6,7-tetrahydro-s-indacen-1-yl)_2ZrCl_2$, $Me_2Si(2-Me-4-(2-(5-methylfuryl))-1,5,6,7-tetrahydro-s-indacen-1-yl)_2ZrCl_2$, $Me_2Si(2-Me-4-(4-pyridyl)-1,5,6,7-tetrahydro-s-indacen-1-yl)_2ZrCl_2$, and their corresponding dimethyl derivatives.

Throughout the disclosure above, where a narrower definition of a substituent is presented, that narrower definition is deemed disclosed in conjunction with all broader and narrower definitions of other substituents in the application.

Synthesis

The ligands required to form the cataysts of the invention can be synthesised by any process and the skilled organic chemist would be able to devise various synthetic protocols for the manufacture of the necessary ligand materials. WO2006/097497 discloses the necessary chemistry and as herein incorporated by reference.

Cocatalyst

To form an active catalytic species it is normally necessary to employ a cocatalyst as is well known in the art. Cocatalysts comprising a organometal compound of Group 13 metal, like organoaluminium compounds used to activate metallocene catalysts are suitable for use in this invention.

The olefin polymerisation catalyst system of the invention comprises (i) a complex in which the metal ion is coordinated by a ligand of the invention; and normally (ii) an aluminium alkyl compound (or other appropriate cocatalyst), or the reaction product thereof. Thus the cocatalyst is preferably an alumoxane, like MAO or an alumoxane other than MAO.

Alternatively, however, the catalysts of the invention may be used with other cocatalysts, e.g. boron compounds such as $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4{}^{2-}$.

The use of aluminoxanes, especially MAO, is highly preferred.

Suitable amounts of cocatalyst will be well known to the skilled man. Typically Al to M molar ratios are from 100:1 to 1000:1 mol/mol. Preferably when an aluminium alkyl is used as a cocatalyst, the molar ratio of the aluminium in the activator to the transition metal in the complex is from 1 to 500 mol/mol, preferably from 2 to 100 mol/mol and in particular from 5 to 50 mol/mol.

Manufacture

The catalyst of the invention is a solid but no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in a solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained.

By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent, to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with an uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e. g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, $NR''_2$, —COOH, —$COONH_2$, oxides of alkenes, —CR''=$CH_2$, where R'' is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, $NR''_2$, —COOH, —$COONH_2$, oxides of alkenes, —CR''=$CH_2$, where R'' is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e. g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e. g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e. g. be subjected to an immediate (within milliseconds to few seconds) temperature change in order to achieve an instant solidification of the component (s) within the droplets. The appropriate temperature change, i. e. an increase or a decrease in the temperature of an emulsion system, required for the desired solidification rate of the components cannot be limited to any specific range, but naturally depends on the emulsion system, i. a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e. g. as stated above, whereby said temperature change of the emulsion system is sufficient to cause the rapid solidification of the droplets. The receiving medium can be gaseous, e. g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e. g. perfluorinated hydrocarbon.

Alternatively, the temperature difference may be effected by gradual heating of the emulsion system, e. g. up to 10° C.

per minute, preferably 0.5 to 6° C. per minute and more preferably in 1 to 5° C. per minute.

In case a melt of e. g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. fluorous solvents with organic solvents can be found from the literature and be chosen accordingly by a skilled person. Also the critical temperatures needed for the phase change are available from the literature or can be determined using methods known in the art, e. g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e. g. if the amount of the monomer used for the prepolymerisation is relatively large.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e. g. by filtration and subsequent washing of the solids with a suitable solvent.

The droplet shape of the particles may be substantially maintained. The formed particles may have an average size range of 1 to 500 µm, e.g. 5 to 500 µm, advantageously 5 to 200 µm or 10 to 150 µm. Even an average size range of 5 to 60 µm is possible. The size may be chosen depending on the polymerisation the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 80° C., preferably at about 70 to 80° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Polymerisation

The olefin polymerized using the catalyst of the invention is preferably ethylene or an alpha-olefin or a mixture of ethylene and an α-olefin or a mixture of alpha olefins, for example $C_{2-20}$ olefins, e.g. ethylene, propene, 1-butene, 1-hexene, 4-methyl-1-pentene, 1-octene etc. The olefins polymerized in the method of the invention may include any compound which includes unsaturated polymerizable groups. Thus for example unsaturated compounds, such as $C_{6-20}$ olefins (including cyclic and polycyclic olefins (e.g. norbornene)), and polyenes, especially $C_{4-20}$ dienes, may be included in a comonomer mixture with lower olefins, e.g. $C_{2-5}$ α-olefins. Diolefins (i.e. dienes) are suitably used for introducing long chain branching into the resultant polymer. Examples of such dienes include α,ω linear dienes such as 1,5-hexadiene, 1,6-heptadiene, 1,8-nonadiene, 1,9-decadiene, etc.

The catalysts of the present invention are particularly suited for use in the manufacture of polypropylene polymers, either homo or copolymers thereof. As comonomers are preferably used ethylene, or higher olefins of C4-C12 olefins, like butene, hexene, octene or any mixtures thereof.

Polymerization in the method of the invention may be effected in one or more, e.g. 1, 2 or 3, polymerization reactors, using conventional polymerization techniques, e.g. gas phase, solution phase, slurry or bulk polymerization.

In general, a combination of slurry (or bulk) and at least one gas phase reactor is often preferred, particularly with the reactor order being slurry (or bulk) then one or more gas phase reactors.

In case of propylene polymerisation for slurry reactors, the reaction temperature will generally be in the range 60 to 110° C. (e.g. 6-90° C.), the reactor pressure will generally be in the range 5 to 80 bar (e.g. 40-65 bar), and the residence time will generally be in the range 0.3 to 5 hours (e.g. 0.5 to 2 hours). The monomer is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0.5 to 8 hours (e.g. 0.5 to 4 hours) The gas used will the monomer optionally as mixture with a non-reactive gas such as nitrogen. In addition to actual polymerisation steps and reactors, the process can contain any additional polymerisation steps, like prepolymerisation step, and any further after reactor handling steps as known in the art.

Generally the quantity of catalyst used will depend upon the nature of the catalyst, the reactor types and conditions and the properties desired for the polymer product. As is well known in the art hydrogen can be used for controlling the molecular weight of the polymer. It is particularly notable that the catalyst of the present invention performs exceptionally well over a wide range of hydrogen concentration used during the polymerisation process, which makes the catalyst beneficial to be used for productions of a wide range of polymers This forms a further aspect of the invention. The activity of the catalysts of the invention is also very high and the polymer productivity levels are excellent.

The polymers made by the catalysts of the invention are useful in all kinds of end articles such as pipes, films, moulded articles (e.g. injection moulded, blow moulded, rotomoulded articles), extusion coatings and so on.

The invention will now be illustrated by reference to the following non-limiting Examples and figure. FIG. 1 shows a comparison between the catalyst of inventive Example 1 (squares) and comparative catalyst example B (triangles) in terms of their catalyst activity vs Intrinsic viscosity.

EXAMPLES

Measurement Methods

Al and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 20 ppm Zr in a solution of 5% $HNO_3$, 3% HF in DI water) and a quality control sample (20 ppm Al, 10 ppm Zr in a solution of 5% $HNO_3$, 3% HF in DI water). The content of zirconium was monitored using the 339.198 nm line, the content of aluminium via the 396.152 nm line and the potassium using the 766.490 nm line. The reported values, required to be between 0 and 100, or further dilution is required, are an average of three successive aliquots taken from the same sample and are related back to the original catalyst using equation 1.

$$C = \frac{R \times V}{M} \quad \text{Equation 1}$$

Where:
  C is the concentration in ppm, related to % content by a factor of 10,000
  R is the reported value from the ICP-AES
  V is the total volume of dilution in ml
  M is the original mass of sample in g If dilution was required then this also needs to be taken into account by multiplication of C by the dilution factor.

Intrinsic Viscosity

Polymer samples were dissolved in 1,2,3,4 tetrahydronaphtalene at the concentration of 1 mg/ml and at the temperature of 135° C. The relative viscosity of the dilute polymer solution was measured according to the ISO1628-1 by use of an Automated Ubbelohde Capillary Viscometer; LAUDA PVS1. The relative viscosity of the dissolved polymer solution was determined as a ratio of the measured kinematic viscosities of the polymer solution and the pure solvent. Approximate intrinsic viscosity was calculated from a single viscosity measurement at known concentration by use of Huggins equation and known Huggins constant.

Melting Temperature $T_m$ [° C.] and Crystallisation Temperature $T_c$ [° C.]:

Melting temperature ($T_m$), crystallization temperature ($T_c$), were measured (according to ISO 11357-3:1999) with Mettler TA820 differential scanning calorimetry (DSC) on 5 to 10 mg, typically 8±0.5 mg samples. Both crystallization and melting curves were obtained during 10° C./min cooling and heating scans between 30° C. and 225° C. Melting and crystallization temperatures were taken as the peaks of endotherms and exotherms.

$^{13}C$ NMR:

Quantitative solution state $^{13}C\{^{1}H\}$ nuclear magnetic resonance (NMR) spectra were recorded using a Bruker Avance III 400 NMR spectrometer with a 9.4 T superconducting standard-bore magnet operating at 400.15 and 100.62 MHz for $^{1}H$ and $^{13}C$ respectively. Approximately 200 mg of material were dissolved in approximately 3 ml of 1,1,2,2-tetrachloroethane-$d_2$ (TCE-$d_2$) inside a 10 mm NMR tube. The measurements were done at 125° C. using a $^{13}C$ optimised 10 mm selective excitation probehead with nitrogen gas for all pneumatics.

The tacticity distribution at the pentad level and regio misinsertions were determined from the quantitative $^{13}C\{^{1}H\}$ NMR spectra after basic assignment as in: V. Busico and R. Cipullo, Progress in Polymer Science, 2001, 26, 443-533, and based on the method described in: C. De Rosa, F. Auriemma, M. Paolillo, L. Resconi, I. Camurati. Quantification of the pentad distribution was done through integration of the methyl region in the $^{13}C\{^{1}H\}$ spectra and when applicable corrected for any sites not related to the stereo sequences of interest, e. g. regio misinsertions.

Used Chemicals

MC-A (rac-μ-{bis-[η$^5$-2-methyl-4-(4-tert-butylphenyl)-1,5,6,7-tetrahydro-s-indacen-1-yl]dimethylsilanediyl}dichlorozirconium,) was prepared as described in WO2006/097497A1. The $^{1}H$ NMR spectrum of it corresponds to that reported in the mentioned patent application.

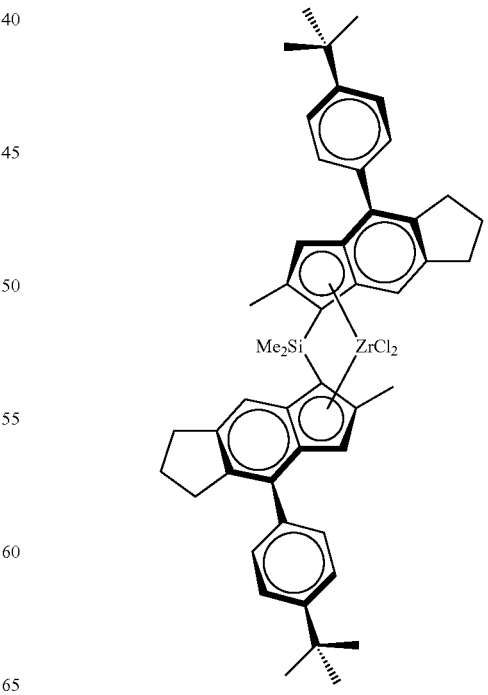

MAO was purchased from Albermarle and used as a 30 wt-% solution in toluene. Perfluoroalkylethyl acrylate esters (CAS number 65605-70-1) were purchased from the Cytonix Corporation, dried and degassed prior to use. Hexadecafluoro-1,3-dimethylcyclohexane was dried and degassed prior to use. Propylene was provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes or needles.

Catalyst Preparation

Example 1

Invention

The catalyst was prepared according to the procedure described in the Example 5 of WO 2003/051934 with hexadecafluoro-1,3-dimethylcyclohexane as the continuous phase, a mixture of perfluoroalkylethyl acrylate esters having different perfluoroalkyl chain lengths as the surfactant precursor and (rac-μ-{bis-[$\eta^5$-2-methyl 4-(4-tert-butylphenyl)-1,5,6,7-tetrahydro-s-indacen-1-yl] dimethylsilanediyl}dichlorozirconium as the metallocene.

The detailed catalyst preparation was performed as follows. Inside a glovebox, 80 μL of commercial mixture of dry and degassed perfluoroalkylethyl acrylate esters were mixed with 2 mL of MAO in a septum bottle and left to react overnight (surfactant solution). The following day, 61.40 mg of the metallocene was dissolved in 4 mL of the MAO solution in another septum bottle and left to stir inside the glovebox (catalyst solution).

After 60 minutes, the 4 mL of the catalyst solution and 1 mL of the surfactant solution were successively added into a 50 mL emulsification glass reactor containing 40 mL of hexadecafluoro-1,3-dimethylcyclohexane at −10° C. and equipped with an overhead stirrer (stirring speed=600 rpm). A red-orange emulsion formed immediately (measured emulsion stability=15 seconds) and was stirred during 15 minutes at 0° C./600 rpm. The emulsion was then transferred via a ⅔ Teflon tube to 100 mL of hot hexadecafluoro-1,3-dimethylcyclohexane at 90° C., and stirred at 600 rpm until the transfer was completed. The stirring speed was reduced to 300 rpm and the oil bath was removed. Stirring was continued at room temperature for 15 more minutes. When the stirrer was switched off, the catalyst was left to settle up on top of the continuous phase which was siphoned off after 45 minutes. The remaining red solid catalyst was dried during 2 hours at 50° C. over an argon flow. 0.23 g of a red free flowing powder was obtained.

Comparative Examples

The catalyst of the invention was compared to a catalyst in solid particulate form without external carrier prepared according to the above described procedure with hexadecafluoro-1,3-dimethylcyclohexane as the continuous phase, a mixture of perfluoroalkylethyl acrylate esters having different perfluoroalkyl chain lengths as the surfactant precursor and rac-cyclohexyl(methyl)silanediylbis[2-methyl-4-(4'-tert-butylphenyl)indenyl]zirconium dichloride as the metallocene (comparative example A1).

The catalyst of the invention was also compared to a silica supported catalyst (rac-μ-{bis-[$\eta^5$-2-methyl 4-(4-tert-butylphenyl)-1,5,6,7-tetrahydro-s-indacen-1-yl] dimethylsilanediyl}dichlorozirconium metallocene (Comparative Example A2) with ES7hh0Y silica (PQ Corporation, surface area=306 m²/g, pore volume=1.54 mL/g, D50=104.3 μm) prepared by following the procedure described in WO2006/097497.

Catalyst Preparation

The detailed catalyst preparation was performed as follows:

Inside a glovebox, 6.3 g of dried ES70Y silica were placed into a round-bottom flask equipped with an overhead stirrer followed by 30 mL of dry and degassed toluene. The resulting suspension was cooled to 0° C. under mild stirring (200-300 rpm) and 15.1 mL of a 30 wt-% MAO solution in toluene (Albemarle) were slowly added (drop by drop). The cooling bath was removed and the suspension was stirred for 2 additional hours.

The liquid phase was removed by canula filtration and another 20 mL of dried and degassed toluene were added. The suspension was stirred during 15 minutes at room temperature and the liquid phase filtered off. 20 mL of dried and degassed toluene were added to the flask and the suspension stirred during 30 minutes at 80° C. before filtration of the liquid residues. This last toluene washing was repeated before another 20 mL of dried and degassed toluene was added to the remaining silica powder and the system was cooled down the system to 15° C.

Inside the glovebox, 2 mL of the 30 wt-% MAO solution were added to a solution of 207 mg of metallocene (1) in 2 mL of toluene in a inert flask. This catalyst solution was slowly added to the silica suspension and stirred during 1 hour. The temperature was increased to 40° C. and the suspension stirred during 2 more hours. The liquids were then filtered off and 20 mL of dried and degassed toluene added and the suspension stirred during 30 minutes at 60° C. before filtering of the liquid phase. This last step was repeated twice and the final catalyst was dried under vacuum until a constant weight was obtained, yielding 7.3 g of the silica supported catalyst. Catalyst properties are summarised below:

TABLE 1

Catalyst syntheses summary

| Code | Yield | ICP analyses | | |
|---|---|---|---|---|
| | | Al (%) | Zr (%) | Al/Zr (molar) |
| Example 1 | 0.23 g | 25.20 | 0.32 | 266 |
| Comparative Example A1 | 0.55 g | 26.30 | 0.37 | 240 |
| Comparative Example A2 | 7.3 g | 14.70 | 0.17 | 292 |

The catalyst of the invention was also compared to the polymerisation examples obtained in bulk propylene with a (rac-μ-{bis-[$\eta^5$-2-methyl-4-(4-tert-butylphenyl)-1,5,6,7-tetrahydro-s-indacen-1-yl] dimethylsilanediyl}dichlorozirconium based catalyst supported on silica (catalyst B) disclosed in WO2006/097497. The same cocatalyst was used throughout.

Polymerisations: Homopolymerisation of Propylene

The polymerisations were performed in a 5 L reactor. 200 μl of triethylaluminum was fed as a scavenger in 5 mL of dry and degassed pentane. The desired amount of hydrogen was then loaded (measured in mmol) and 1100 g of liquid propylene was fed into the reactor. The temperature was set to 30° C. The desired amount of catalyst (7 to 30 mg) in 5 mL of hexadecafluoro-1,3-dimethylcyclohexane is flushed into the reactor with a nitrogen overpressure. The temperature is then raised to 70° C. over a period of 15 minutes. The polymerisation is stopped after 30 minutes by venting the reactor and flushing with nitrogen before the polymer is collected.

Polymerisation examples based on catalyst B are displayed in Table 3 and the comparison of Example 1 cat vs. catalyst B is depicted in Graph 1.

TABLE 2

Polymerisation results

| Run | Catalyst | $H_2$ (mmol) | Activity Kg/g cat/h | Metal Activity (kg/g Zr/h) | $MFR_2$ (g/10 min) | $MFR_{21}$ (g/10 min) | IV(THN) (dL/g) | Tm (° C.) | Tc (° C.) | mm (%) | 2.1 errors (%) |
|---|---|---|---|---|---|---|---|---|---|---|---|
| 1 | Inv. | 0.00 | 4.90 | 1531 | — | 0.9 | 5.35 | — | — | — | — |
| 2 | Inv. | 1.00 | 36.90 | 11531 | — | 4.3 | 4.01 | — | — | — | — |
| 3 | Inv. | 6.00 | 92.30 | 28844 | 2.0 | — | 2.10 | 154.9 | 111.7 | 99.6 | 0.7 |
| 4 | Inv. | 15.00 | 127.00 | 39688 | 17.4 | — | 1.26 | — | — | — | — |
| 5 | Inv. | 25.00 | 156.00 | 48750 | 106.0 | — | 0.88 | — | — | — | — |
| 6 | A1 | 1.00 | 14.1 | 3811 | — | 12.5 | 3.53 | — | — | — | — |
| 7 | A1 | 6.00 | 22.3 | 6027 | 1.3 | — | 2.10 | 151.1 | 110.3 | — | — |
| 8 | A1 | 15.00 | 28.5 | 7703 | 12.3 | — | 1.37 | — | — | — | — |
| 9 | A2 | 1.00 | 7.0 | 4118 | — | 2.0 | — | — | — | — | — |
| 10 | A2 | 6.00 | 32.8 | 19294 | 1.3 | — | — | — | — | — | — |
| 11 | A2 | 15.00 | 35.0 | 20588 | 20.2 | — | — | — | — | — | — |

Table 2: Runs 1 to 5 use the catalyst of the invention; runs 6 to 8 catalyst A1 (comparative) and runs 9 to 11 catalyst A2.

TABLE 3

Polymer data from Catalyst B (Comparative)

| Run | $H_2$ (mmol) | Activity Kg/g cat/h | Metal Activity (kg/g Zr/h) | IV (THN) (dL/g) | $M_W$ (kg/mol) | MWD | Tm (° C.) |
|---|---|---|---|---|---|---|---|
| a | 0.00 | 1.70 | — | — | 1200.00 | 3.90 | 153.40 |
| b | 1.20 | 8.12 | 4345 | 4.60 | — | — | — |
| c | 2.50 | 19.30 | 10325 | 3.70 | — | — | — |
| d | 5.00 | 41.20 | 22068 | 3.00 | — | — | — |
| e | 5.00 | 42.87 | 22926 | 2.30 | — | — | — |
| f | 7.00 | 32.60 | 17945 | 1.80 | — | — | — |

The invention claimed is:

1. A process for preparing polypropylene homopolymers or propylene copolymers polymerized from propylene and at least one comonomer;
  wherein the process comprises reacting propylene and optionally at least one comonomer in the presence of a solid particulate catalyst free from an external carrier, wherein the solid particulate catalyst comprises:
  (i) a complex of formula (I):

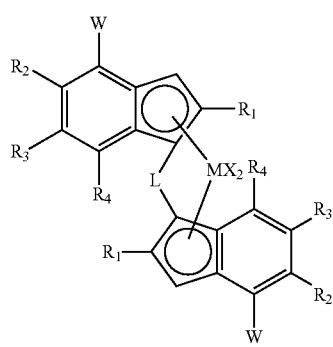

(I)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-arylalkyl;

each $R_1$ independently is hydrogen or a linear or branched C1-C20 hydrocarbyl radical optionally containing one or more heteroatoms from groups 14-16 of Periodic Table of the Elements;

each $R_2$ and $R_3$ taken together form a 4-7 membered ring condensed to a benzene ring of the indenyl moiety, the condensed 4-7 member ring optionally containing heteroatoms from groups 14-16, each atom forming the condensed 4-7 member ring being optionally substituted with at least one $R_{18}$ radical;

each $R_{18}$ radical, if present, is the same or different and can be a C1-C20 hydrocarbyl radical optionally containing one or more heteroatoms belonging to groups 14-16;

each $R_4$ is a hydrogen atom or a $C_{1-6}$-hydrocarbyl radical optionally containing one or more heteroatoms belonging to groups 14-16;

each W is independently a 5 or 6 membered aryl or heteroaryl ring wherein each atom of the aryl or heteroaryl ring is optionally substituted with an $R_5$ group;

each $R_5$, if present, is the same or different and is a C1-C20 hydrocarbyl radical optionally containing one or more heteroatoms belonging to groups 14-16; and optionally two adjacent $R_5$ groups, if present, taken together can form a further mono or multicyclic ring condensed to W optionally substituted by one or two groups $R_5$; and (ii) a cocatalyst comprising an organometallic compound of a Group 13 metal.

2. The process of claim 1, wherein the solid particulate catalyst is obtained by a process comprising:
  (I) forming a liquid/liquid emulsion system, wherein the liquid/liquid emulsion system comprises a solution of the complex of formula (I) and the cocatalyst dispersed in a solvent so as to form dispersed droplets; and
  (II) solidifying the dispersed droplets to form solid particles.

3. The process of claim 1, wherein the complex of formula (I) comprises two identical multicyclic ligands connected to the metal.

4. The process of claim 1, wherein each X is independently a hydrogen atom, a halogen atom, $C_{1-6}$-alkoxy group or an R group, wherein R is a $C_{1-6}$-alkyl, phenyl or benzyl group.

5. The process of claim 1, wherein L is an ethylene bride or —SiR'$_2$, wherein R' is $R^6$, and wherein each $R^6$ is independently C1-C20-alkyl, C6-C20-aryl, or tri(C1-C20-alkyl)silyl-residue.

6. The process of claim 1, wherein each $R_1$ is independently a linear or branched $C_{1-10}$-alkyl radical.

7. The process of claim 1, wherein each $R_2$ and $R_3$, taken together form a non aromatic 4-7 membered ring or a phenyl ring.

8. The process of claim 1, wherein at least one $R_{18}$ is present and is independently linear or branched, $C_{1-10}$-alkyl radical.

9. The process of claim 1, wherein each $R_4$ is independently a hydrogen atom or methyl, ethyl, propyl or isopropyl group.

10. The process of claim 1, wherein each W is independently an optionally substituted phenyl group, or a 5 or 6 membered heteroaryl group selected from furanyl, thiophenyl, pyrrolyl, triazolyl, and pyridinyl.

11. The process of claim 1, wherein at least one $R_5$ is present and is independently a linear or branched, cyclic or acyclic, C1-C10-alkyl group or two adjacent $R_5$ groups taken together can form a further mono or multicyclic aromatic ring condensed to W.

12. A process for preparing polypropylene homopolymers or propylene copolymers polymerized from propylene and at least one comonomer;
wherein the process comprises reacting propylene and optionally at least one comonomer in the presence of a solid particulate catalyst free from an external carrier, wherein the solid particulate catalyst comprises:
(i) a complex of formula (II);

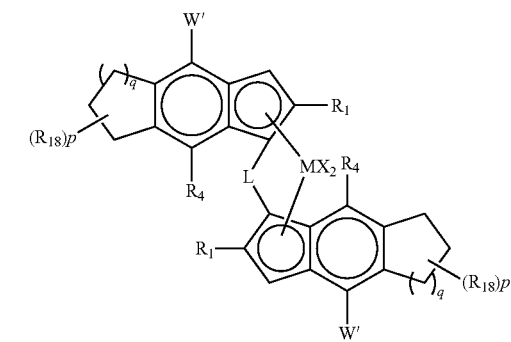

wherein
M is zirconium or hafnium;
each $R_1$ is a linear or branched C1-10 alkyl;
L is ethylene or —SiR'$_2$, wherein R' is $R^6$ and wherein $R^6$ is C1-10 alkyl, $C_{6-10}$-aryl, $C_{7-12}$-alkylaryl, or $C_{7-12}$-arylalkyl;
each X is a hydrogen atom, $C_{1-6}$alkoxy, a halogen atom, or an R group, wherein R is $C_{1-10}$ alkyl;
each $R_4$ is H or $C_{1-3}$-alkyl;
each q is 1 to 3;
each p is 0 to 5;
W' is phenyl, pyridyl, thiophenyl or furyl optionally substituted by up to 2 groups $R_5$;

each $R_5$, if present, is $C_{1-10}$-alkyl or two adjacent $R_5$ groups taken together form a phenyl ring fused to W' or two adjacent $R_5$ groups taken together form the atoms necessary to form a carbazolyl group with the W' group; and
each $R_{18}$ is $C_{1-6}$-alkyl; and
(ii) a cocatalyst comprising an organometallic compound of a Group 13 metal.

13. A process for preparing polypropylene homopolymers or propylene copolymers polymerized from propylene and at least one comonomer;
wherein the process comprises reacting propylene and optionally at least one comonomer in the presence of a solid particulate catalyst free from an external carrier, wherein the solid particulate catalyst comprises:
(i) a complex of formula (III)

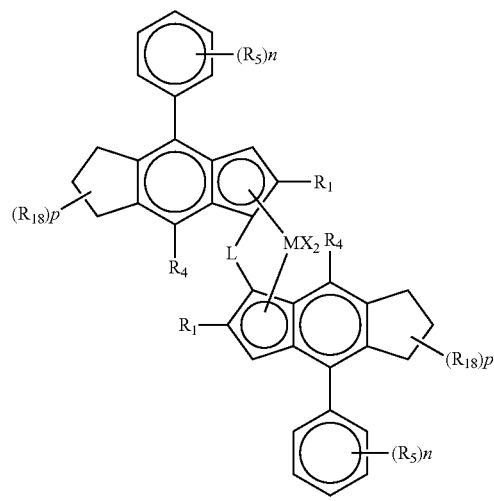

wherein
M is zirconium or hafnium;
each $R_1$ is a linear or branched C1-10 alkyl;
L is ethylene or —SiR'$_2$, wherein R' is $R^6$ and wherein $R^6$ is C1-10 alkyl, $C_{6-10}$-aryl, $C_{7-12}$-alkylaryl, or $C_{7-12}$-arylalkyl;
each X is a hydrogen atom, $C_{1-6}$alkoxy, a halogen atom, or an R group; wherein R is $C_{1-10}$ alkyl;
each $R_4$ is H or $C_{1-3}$-alkyl;
n is 0 to 2;
p is 0 to 2;
each $R_5$ is $C_{1-10}$-alkyl; and
each $R_{18}$ is $C_{1-6}$-alkyl, and
(ii) a cocatalyst comprising an organometallic compound of a Group 13 metal.

14. The process of claim 13, wherein
M is Zirconium;
$R_1$ is methyl or ethyl;
L is SiR'$_2$; wherein R' is $R^6$, and wherein $R^6$ is $C_{1-6}$ alkyl;
each X is a halogen atom, methoxy, or methyl;
$R_4$ is H or methyl;
n is 1;
p is 0 or 1;
$R_5$ is $C_{1-6}$ alkyl; and
$R_{18}$ is $C_{1-6}$ alkyl.

* * * * *